United States Patent
Agafonov et al.

(10) Patent No.: US 9,329,039 B2
(45) Date of Patent: May 3, 2016

(54) NON-MAGNETIC AZIMUTH SENSING WITH MET ELECTROCHEMICAL SENSORS

(75) Inventors: Vadim M. Agafonov, Moscow Region (RU); Ivan Egorov, Moscow Region (RU); Catherine Rice, Scotch Plains, NJ (US)

(73) Assignee: Met Tech Inc., Jersey City, NJ (US)

( * ) Notice: Subject to any disclaimer, the term of this patent is extended or adjusted under 35 U.S.C. 154(b) by 785 days.

(21) Appl. No.: 13/388,789

(22) PCT Filed: Aug. 6, 2010

(86) PCT No.: PCT/US2010/044689
§ 371 (c)(1),
(2), (4) Date: Mar. 20, 2012

(87) PCT Pub. No.: WO2011/017604
PCT Pub. Date: Feb. 10, 2011

(65) Prior Publication Data
US 2012/0174696 A1    Jul. 12, 2012

Related U.S. Application Data

(60) Provisional application No. 61/231,792, filed on Aug. 6, 2009.

(51) Int. Cl.
*G01C 19/12* (2006.01)
*G01C 19/14* (2006.01)

(52) U.S. Cl.
CPC . *G01C 19/14* (2013.01); *Y10T 74/12* (2015.01)

(58) Field of Classification Search
CPC ................................ G01C 19/12; G01C 19/14
USPC ................. 74/5 R, 5.6 C, 5.6 E, 5.46, 5.4; 73/504.04–504.07
See application file for complete search history.

(56) References Cited

U.S. PATENT DOCUMENTS

| | | | | | |
|---|---|---|---|---|---|
| 2,856,142 | A | * | 10/1958 | Haviland | B64G 1/28 114/125 |
| 2,878,678 | A | * | 3/1959 | Hurlburt | G01C 19/38 74/5.41 |
| 3,308,550 | A | * | 3/1967 | Katz | G01C 19/14 33/315 |

(Continued)

FOREIGN PATENT DOCUMENTS

| EP | 0 979 412 | 11/2002 |
|---|---|---|
| WO | WO 92/09897 | 6/1992 |

OTHER PUBLICATIONS

Met Tech, Inc., International Search Report from PCT/US2010/044689 dated Sep. 30, 2010.

*Primary Examiner* — William Kelleher
*Assistant Examiner* — Thomas Magnuson
(74) *Attorney, Agent, or Firm* — Kenneth H. Sonnenfeld; Joseph D. Eng, Jr.; King & Spalding LLP

(57) ABSTRACT

This invention provides a new category of inertial sensors (linear and angular accelerometers, gyroscopes, inclinometers and seismometers) called Molecular Electronic Transducers (MET). Unlike other inertial sensors, MET sensors use a liquid electrolyte as their inertial mass. The sensors do not contain any precision mechanical parts or springs, and are relatively simple and inexpensive to manufacture.

4 Claims, 8 Drawing Sheets

(56) References Cited

U.S. PATENT DOCUMENTS

| | | | | |
|---|---|---|---|---|
| 4,393,707 A | * | 7/1983 | Ferrar | G01P 9/00 73/504.05 |
| 4,467,984 A | * | 8/1984 | Tippetts | G01C 19/58 137/814 |
| 5,176,030 A | * | 1/1993 | Laughlin | 73/504.07 |
| 5,771,596 A | * | 6/1998 | Bey | G05D 9/02 137/210 |
| 2004/0004472 A1 | | 1/2004 | Meyer | |
| 2007/0250289 A1 | * | 10/2007 | Swope et al. | 702/150 |
| 2008/0073546 A1 | | 3/2008 | Andersson et al. | |

* cited by examiner

NON-MAGNETIC AZIMUTH SENSING WITH MET ELECTROCHEMICAL SENSORS

This application claims the benefit of priority to U.S. Provisional Application No. 61/231,792, titled "Non-magnetic Azimuth Sensing with MET Electrochemical Sensors," filed Aug. 6, 2009. The contents of U.S. Provisional Application No. 61/231,792 are hereby incorporated by reference in their entirety.

FIELD OF THE INVENTION

This invention relates to a category of inertial sensors (linear and angular accelerometers, gyroscopes, inclinometers and seismometers) called Molecular Electronic Transducers (MET).

BACKGROUND OF THE INVENTION

The most difficult requirement for far target location (FTL) is the determination of azimuth heading and inclination, with azimuth the most challenging. Currently, man-portable FTL systems employ a digital magnetic compass (DMC). However, the azimuth accuracy of DMCs is susceptible to errors from the magnetic effects of nearby objects (such as military vehicles), variations in the earth's magnetic field, and improper calibration. Therefore, non-magnetic methods are sought to measure azimuth that are also compact, low power, and economical.

Azimuth heading can be obtained by sensing the earth's rotation using north-finding inertial systems. Gyroscopes with performance high enough to provide the required degree of accuracy for FTL, however, tend to be too bulky and expensive for hand-held applications. MEMS-based gyros are small and inexpensive, but at present can only provide heading accuracies in the few degree range, far from the desired accuracy of ±1 mil. Optically based inertial sensing technologies such as fiber optic gyros (FOGs) and ring laser gyros (RLGs) are capable of the required level of accuracy for azimuth heading measurement, but are large and costly.

SUMMARY OF THE INVENTION

This invention relates to a category of inertial sensors (linear and angular accelerometers, gyroscopes, inclinometers and seismometers) called Molecular Electronic Transducers (MET). Unlike other inertial sensors, MET sensors use a liquid electrolyte as their inertial mass. The sensors do not contain any precision mechanical parts or springs, and are relatively simple and inexpensive to manufacture. METs are a specialized kind of electrolytic cell designed so that motion of the MET, which causes movement (convection) in the liquid electrolyte, can be converted to an electronic signal proportional to acceleration or velocity. MET sensors have inherently low noise and high amplification of signal (on the order of $10^6$), giving them performance that can rival fiber optic gyros (FOGS) and ring laser gyros (RLGS) in a much smaller form factor. They are also inherently insensitive influence by magnetic fields or radiation.

In one embodiment, the invention provides a gyroscope. The gyroscope comprises two intersecting fluid channels, wherein the two fluid channels comprise a first channel and a second channel. The first fluid forms a first closed loop and the second channel forms a second closed loop. The first channel is configured to cause circulation of a liquid electrolyte through the first closed loop. The second channel comprises a molecular electronic transducer that is configured to measure a current flow in the second closed loop. In preferred embodiments, the circulation of the liquid electrolyte in the first fluid channel is sustained by magnetohydrodynamic forces. The certain embodiments, the magnetohydrodynamic forces are created by a magnetohydrodynamic cell comprising permanent magnets. The gyroscope may contain a plurality of electrodes within a magnetic field generated by the permanent magnets.

BRIEF DESCRIPTION OF THE DRAWINGS

FIG. 1.

DETAILED DESCRIPTION OF THE INVENTION

Figure 1A:
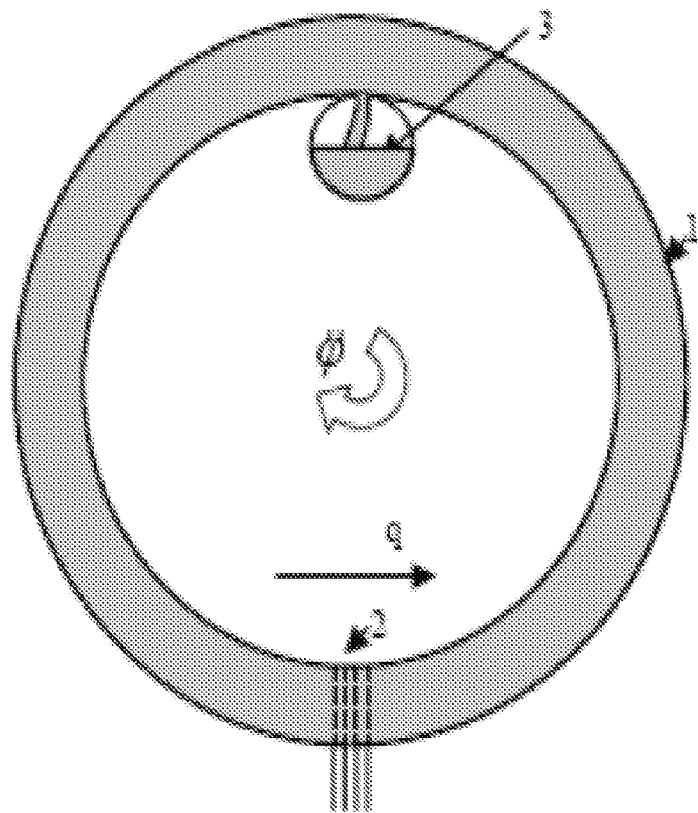
FIG. 1A: Schematic diagram of MET angular accelerometer. 1) Toroid filled with electrolyte. 2) MET transducer. 3) Extended volume for compensation of electrolyte expansion with temperature.

This invention provides a family of inertial sensors based on a different sensing mechanism than conventional electromechanical or optically-based inertial technologies. Rather, the sensors operate based on an electrochemical mechanism. METs capture the physical and chemical phenomena that occur at the surface of electrodes in electrochemical cells as the result of hydrodynamic motion. An advantage of MET sensors is scalability. For instance, in some embodiments, the angular sensors described herein are just 7 mm in diameter. However, if an application requires for example lower noise and higher sensitivity, the size of the device can be increased to achieve the required specifications.

In preferred embodiments of the invention, the MET comprises conductive members, non-limiting examples of which include pairs of metal plates, optionally separated by dielectric spacers. When dielectric spacers are used, the conductive members and spacers are arranged in alternating layers and aligned so that holes in the conductive members and in the spacers coincide to allow flow of a liquid agent (e.g., one containing an electrolyte) as a result of applied external acceleration. For example, the conductive members can be metal plates having output contacts which are connected to sensing electronics and which are separated by dielectric spacers. In certain embodiments, the holes are the same size and shape and are arranged in a regular grid pattern. The dielectric spacers are inserted between the conductive members to prevent possible electric short circuits between them. However, in certain embodiments, the dielectric spacers are also used to cause laminar flow of liquid agent through the sensing element. The thickness of the spacer also affects the frequency range of the measurement, as discussed in U.S. Pat. No. 7,516,660, the contents of which are incorporated by reference in their entirety. The diameter d and the number of holes in the spacer, in turn, determine the sensitivity and have an effect on the frequency dependence of the transfer function in the full frequency operating range. With an increase of the number of holes and an increase of their diameter d the hydrodynamic impedance of the spacer decreases in inverse proportion to the number of holes and the fourth power of their diameter. Thus, by varying the number and diameter of the holes, the transfer function of can be varied. More specifically, the high cutoff frequency of the transfer function is proportional to the hydrodynamic impedance, such that the frequency range increases with increasing hydrodynamic impedance. With this in mind, a useful number of holes is four or more for dielectric spacers that are square, with a side dimension of 1.5×1.5 mm. Moreover, a useful range of hole diameter is between about 1 and about 300 microns, and preferably between about 20 to about 200 microns.

The sensitivity of the MET cell also depends on the physical and chemical properties of the liquid agent contained within the housing of the cell. In preferred embodiments, it is desirable that the liquid agent has a minimum viscosity at maximum solubility. Further, the liquid agent may comprise a salt (e.g., a salt of an alkali metal or an alkaline earth metal) and a solute capable of acting as both a Lewis acid and a Lewis base, such as dissolved metallic iodine. Suitable solvents for this purpose include, for example, distilled water and organic solvents capable of dissolving organic or inorganic salts, preferably metal salts, such as alkali salts. When dissolving the salts of alkali metals, the density of the solution increases, resulting in an increase of the sensitivity of the MET cell. Therefore, in certain embodiments, it is desirable that the concentration of the dissolved salts is high, preferably, close to the solubility limit. Generally speaking, a useful concentration range for the dissolved salt is about 0.5 to about 4.0 mol/liter, and preferably about 2 to about 4 mol/liter. Also, the purities of the salt and the solute that acts as a Lewis acid base (e.g., iodine) should be at least 98.5%, but most preferably at least 99.98%. The electric current output of the MET cell is determined by the concentration of the dissolved metallic iodine, the ions of which are carriers of charge that are capable to receive an electron from and to give back an electron to the conductive members 5. Thus, it is useful to have a saturated solution of the above salts and minimum concentration of 0.0002 N of dissolved metallic iodine. Such a concentration of the dissolved salts provides operation of the instrument in a wide range of negative temperatures, e.g., down to −70° C. The metallic iodine concentration may be lower but in this case the current output of the MET cell may be insufficient for normal operation of the electric circuits, including the circuits used for temperature and frequency correction. A useful concentration range for the dissolved metallic iodine is about 0.0002 to about 0.4 mol/liter, and preferably from about 2 to about 4 mol/liter. The dissolved salts may comprise salts of metals of Group II of the periodic table which have a solubility in the fluid that is not lower than that of salts of alkali metals. The most suitable for this purpose are, for example, salts of barium, which, at maximum solubility, have solution densities that exceed the corresponding solution density of salts of alkali metals by 1.5 times, for a given molar concentration of salt solute.

MET Angular Sensors

Figure 1B:
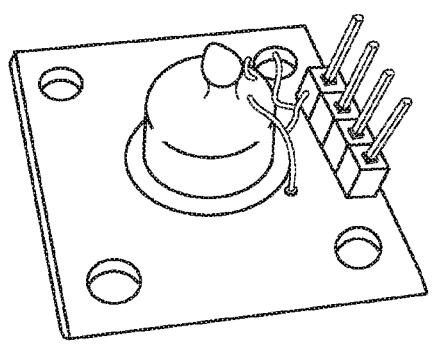
FIG. 1B: drawing of the sensor.
Figure 1C:
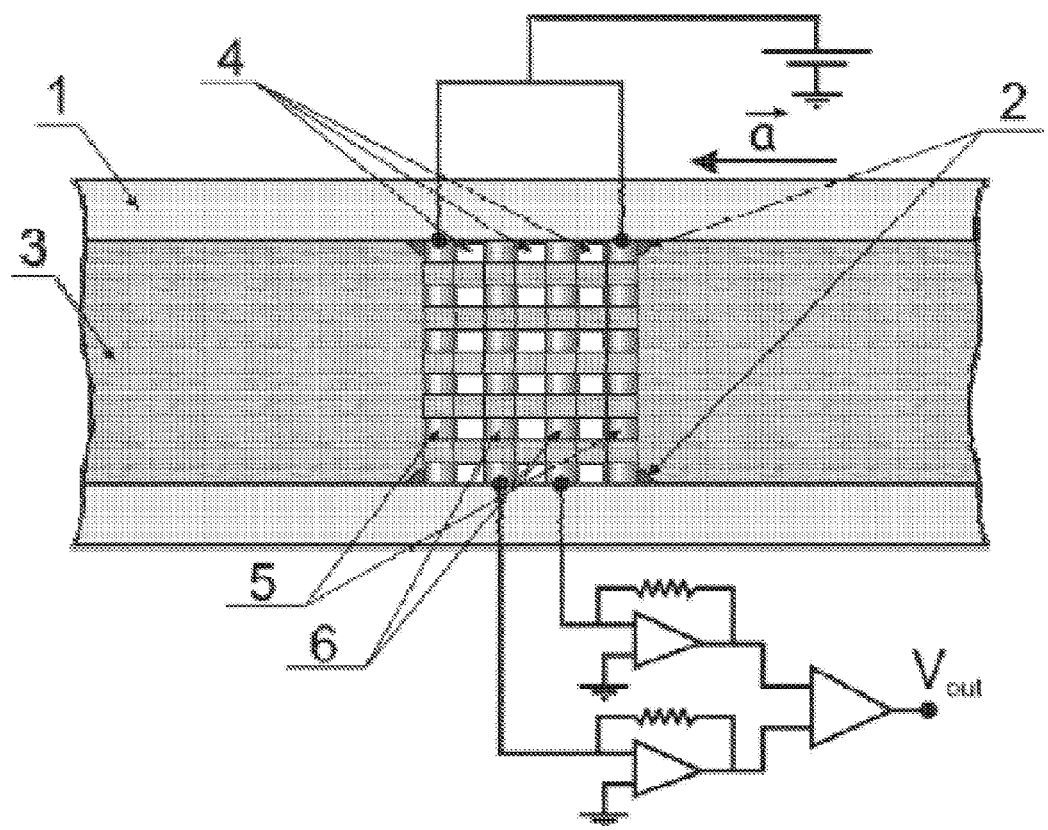
FIG. 1C: Schematic diagram of MET transducer: (1) transducer sealed housing; (2) electrodes; (3) electrolyte solution; (4) dielectric spacers; (5) anodes; and (6) cathodes.

MET Tech has developed an angular accelerometer and rate sensor by placing the MET cell across a toroidal channel. A diagram and photograph of the angular accelerometer are shown in FIG. 1. In addition to being compact, high performance and low cost, the MET angular accelerometer shares with other MET sensors an inherent ruggedness and tolerance for extreme shock. The shock resistance of MET angular accelerometers has been tested at Picatinny Arsenal up to 20 kGs in a basic survivability test. A comparison of the performance of the MET angular accelerometer to competing technologies is shown in Table 1.

Figure 2:
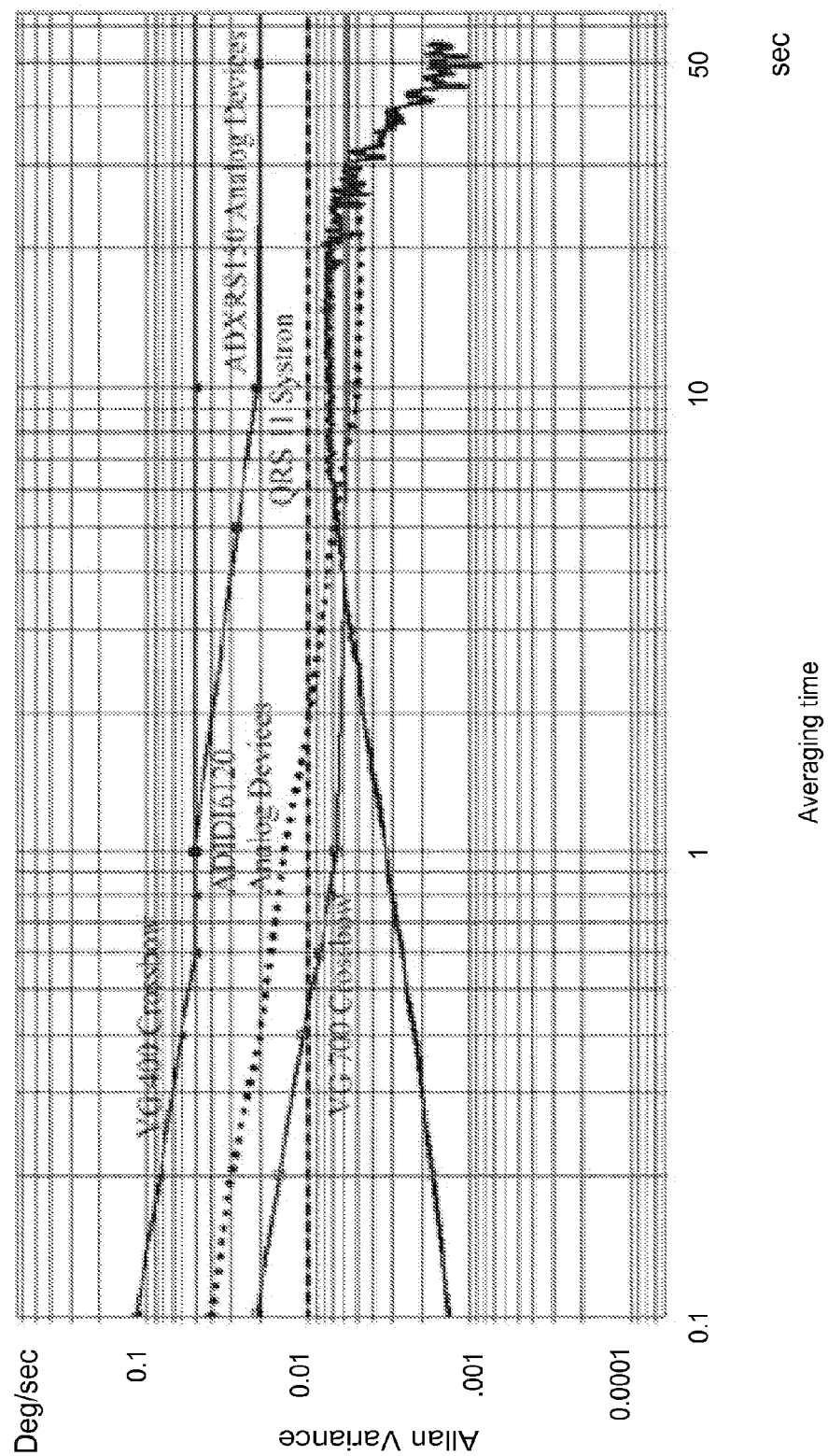
FIG. 2: Allan variance comparative data. The undesignated solid line, lowest on this graph, is the Allan variance curve for the MET MTRS3200 angular rate sensor.

The MET rate sensor, whose external appearance is identical to the accelerometer, is configured to measure angular rate over the frequency range 0.02-300 Hz. The Allan variance of the rate sensor is shown in FIG. 2 along with values for some commercial gyros for comparison, illustrating the competitive performance of MET technology against state-of-the-art commercial sensors.

TABLE 1

Performance of MET angular accelerometer compared to commercially available angular sensors.

| Parameter | State-of-the art MEMS gyro (Analog Devices ADXRS610) | State-of-the art proof mass angular accelerometer (Columbia Research Lab SR-107RFR) | Quartz Rate Sensor (Systron-Donner QRS-11) | MET angular accelerometer |
|---|---|---|---|---|
| Self-noise | $0.05°/sec^2/\sqrt{Hz}$ at 1 Hz | 2 mV RMS (DC To 400 Hz) | $\leq 0.01°/sec^2/\sqrt{Hz}$ (DC to 100 Hz) | $5 * 10-3°/sec^2/\sqrt{Hz}$ (flat in 0.01 to 50 Hz freq. range) |
| Size | <400 mm3 | >400 mm3 | >400 mm3 | <400 mm3 |
| Shock resistance | 2000 G | 1000 G | 200 G | At least 20,000 G, projected 50,000 G |
| Cumulative error | 20°/hr | 50°/hr | 0.01°/hr | Equiv. to 3°/hr |
| Dynamic range | 64 dB | — | 80 dB | 105 dB |
| Power consumption | 6 mA | 20 mA | ≤80 mA | 1.3 mA |

Currently developed MET angular sensors do not measure velocity down to DC, and thus are not capable of measuring the Earth's rotation velocity directly. However, an experiment was carried out that demonstrates the MET rate sensor's ability to measure true North using a modulation technique (similar to gyrocompassing) as described below.

This invention provides MET sensors capable of high-precision non-magnetic azimuth detection. MET angular rate sensors (50 mm in diameter) were mounted on a rotating platform with their sensitivity axis perpendicular to the platform axis of rotation. The axis of the Earth's rotation has a projection on the plane of the toroidal channel of the angular sensor. In the process of platform rotation, this projection of the Earth rotation vector changes sinusoidally corresponding to the frequency of the platform rotation. The amplitude of the signal measured gives one the horizontal projection of the Earth rotation velocity at the local latitude. The phase of the signal contains information about the direction of true north. Ideally, for the angular rate sensor, the maximum of the observed response corresponds to the north direction. In practice, there is some phase error in the sensor response which can be compensated using the predetermined phase characteristic of the sensor. Another way to correct the phase errors is to perform two consecutive tests: first to rotate the sensor clockwise and then counterclockwise. True north will be exactly in the middle between the maximum response peaks in the clockwise and counterclockwise rotations.

Figure 3:
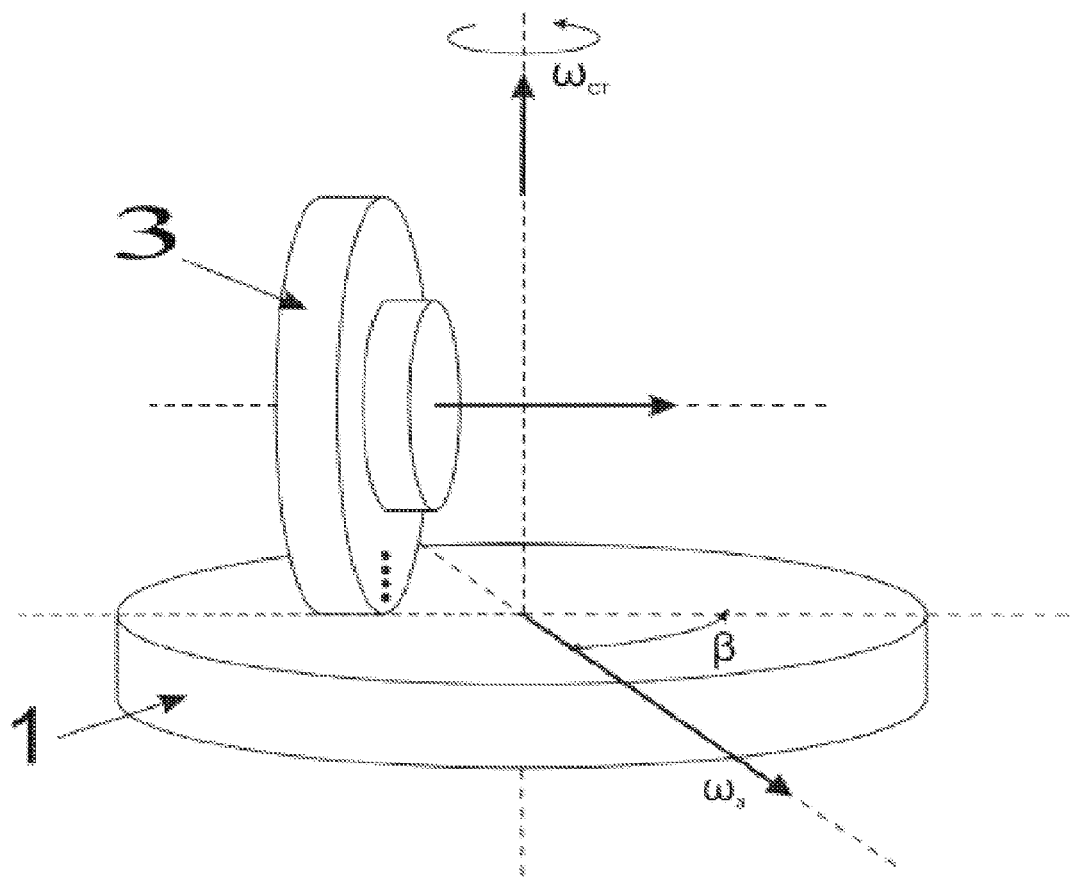
FIG. 3: Configuration for North-seeking measurement experiment. The sensitivity axis of the sensor is shown by the arrow, $\omega_{CT}$-platform rotation velocity, $\omega_3$—the projection of the velocity of the earth rotation on horizontal plane surface, $\beta=\omega_{CT}t$—the angle between the axis of the sensitivity of the sensor and projection of the velocity of the Earth rotation on horizontal surface.

A single axial motion simulator installed in a thermally stabilized chamber was used to generate and control the rotational motion. The experimental configuration is shown in FIG. 3.

Figure 4:
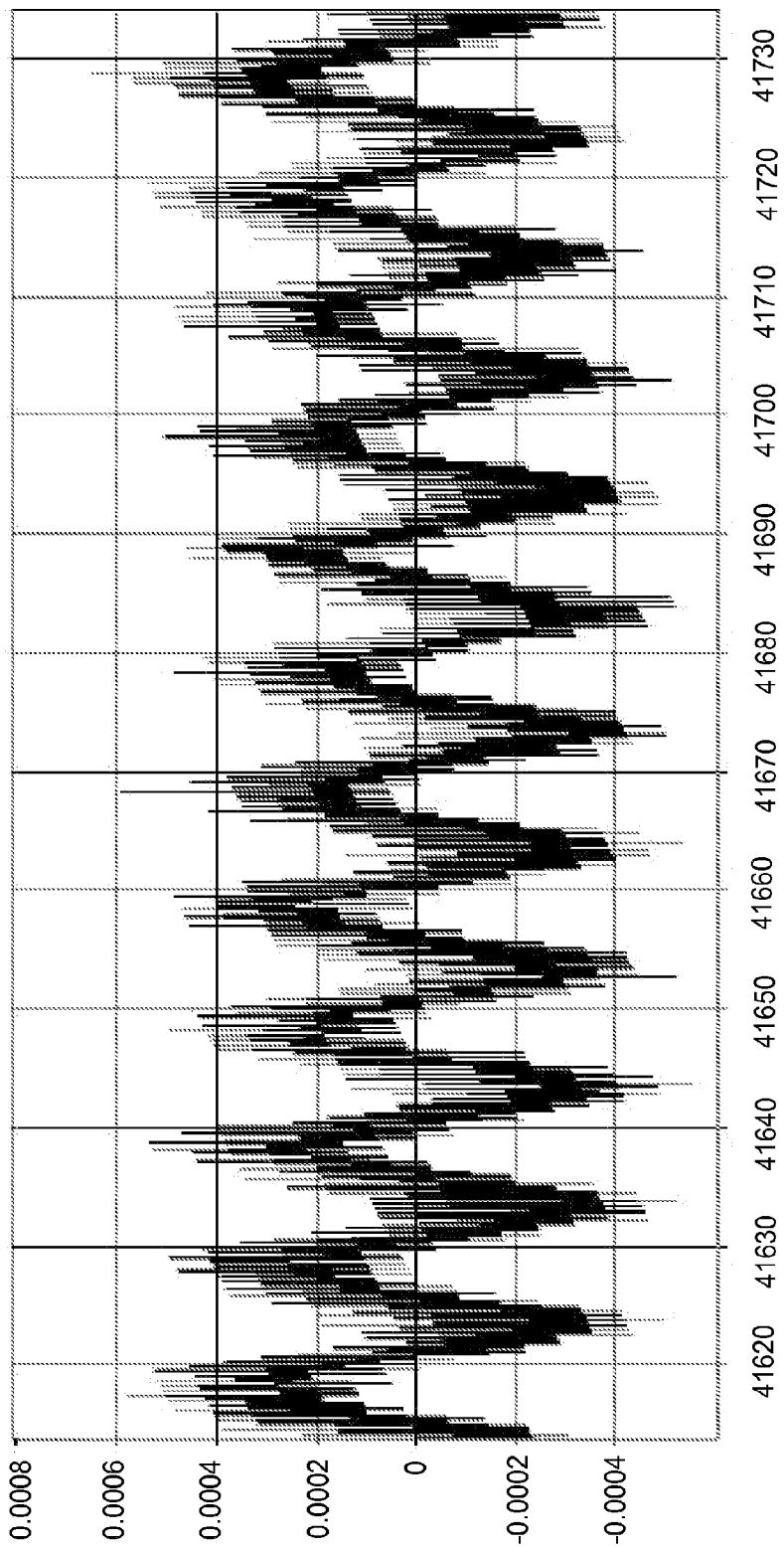
FIG. 4: Signal from MET angular sensor (y axis, volts) during platform rotation as a function of time (x axis, seconds).
Figure 5:
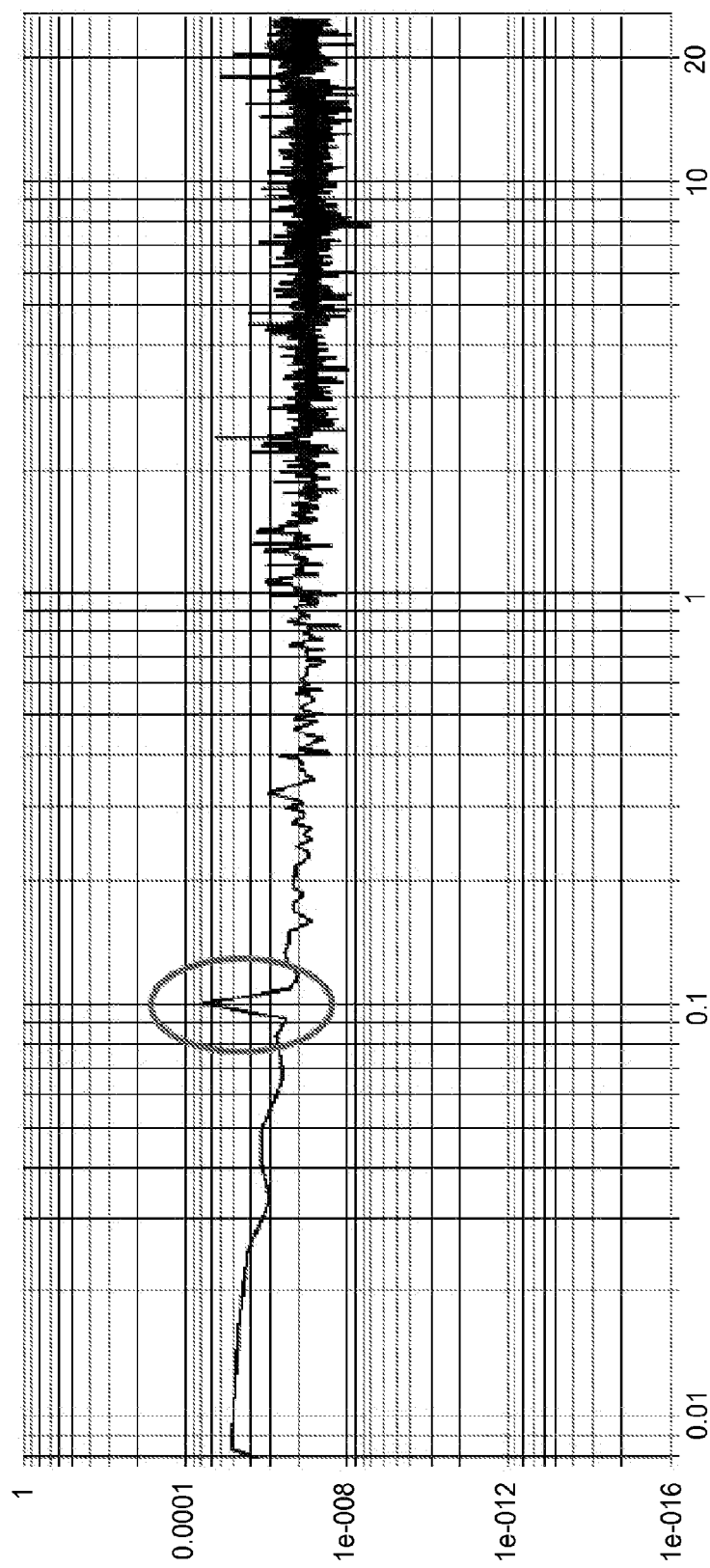
FIG. 5: Signal spectrum of angular sensor under platform rotation. X-coordinate—Frequency (Hz), Y-coordinate—velocity (rad/sec). The maximum velocity at the platform rotation frequency (circled peak) represents the Earth's rotational velocity.

Several experiments were performed at different platform velocities with several different sensors. FIG. 4 shows the signal from a sensor as a function of time during the rotation of the platform. In FIG. 5 a plot of the signal spectrum in polar form (phase, amplitude) is shown. The signal is periodic at the frequency of the platform rotation, and the horizontal projection of the velocity of the Earth's rotation at the local latitude can be calculated from the signal amplitude using the calibrated sensitivity factor of the sensor. To determine the north direction, the phase shift between the maximum of the output signal and zero readout for the angular position of the rotation platform was found in the counterclockwise and clockwise directions. The true north direction relative to the zero of the angular sensor can been found as half of the difference between phases shifts found in these two experiments.

Analysis of the measured angle values between the axis of sensitivity of the sensor and the direction to geographical North had a deviation of not more that 0.10 degrees (1.8 mils) from the actual value at all rotation frequencies, with the best agreement (0.02 degrees, or ~0.4 mils) at the lowest frequency. These results have been confirmed by independent third-party measurements. The data indicate that the MET angular rate sensor can be utilized for measurement of true North with very high accuracy using this modulation technique. In fact, a device to measure azimuth could be constructed using the rate sensor with a rotating platform could be utilized as an accurate azimuth sensor. However, MET Tech has designed a true gyroscope based on the MET transducer that promises even better performance in a smaller footprint, as described below.

The MET Gyroscope

This invention also provides an MET gyroscope. One aspect of the invention is the recognition that to create a MET gyroscope, a MET device design is needed with a rotating inertial mass. One exemplary design for an MET gyroscope according to the invention is shown schematically in FIG. 6. The instrument comprises two fluid channels that intersect at right angles. The rotor channel (1) provides for rotation of the electrolyte, which is sustained by Magneto Hydrodynamic (MHD) cells (2). Channel 2 includes a molecular-electronic transducer (3) and serves as a measurement channel. In this Figure, one part of the measuring channel is visible and the other part is located behind the rotor channel. In preferred embodiments, each MHD cell contains two electrodes (4) located within the magnetic field generated by permanent magnets (5).

Figure 6:
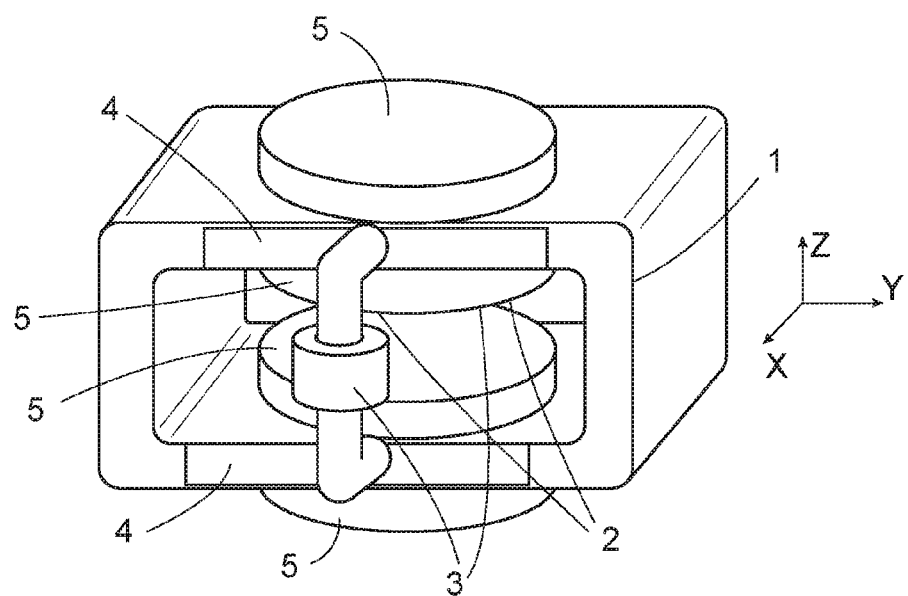
FIG. 6: Schematic design of the MET gyroscope.
Figure 7:
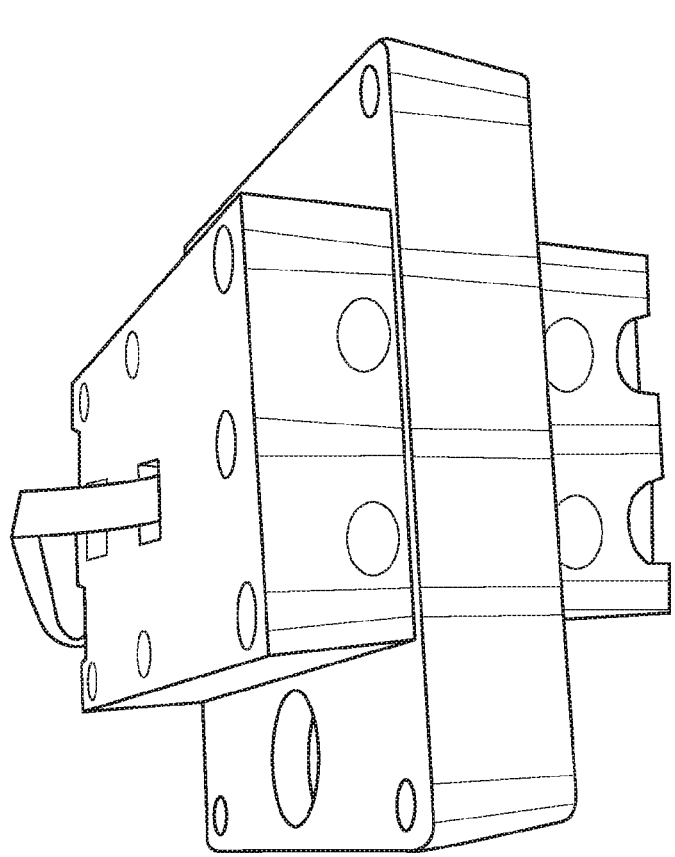
FIG. 7: Schematic design (left) and laboratory demonstration (right) of MET gyroscope.
Figure 7:
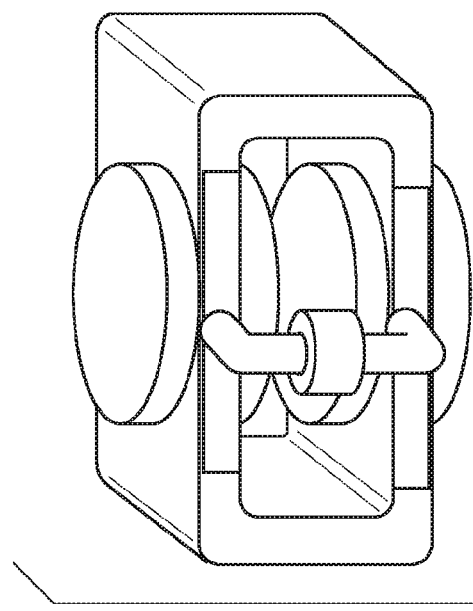

The device illustrated in FIG. 6 operates in the following manner. When the housing rotates around an axis perpendicular to the rotor channel with an angular velocity $\Omega$, a pressure drop ($\Delta P$) arises across the transducers in the measuring channel due to the Coriolis force acting upon the liquid in the rotor channel:

$$\Delta P = 4\rho V \Omega L,$$

where $\rho$ is the electrolyte density, V is the liquid velocity, in rotor channel, and L is the rotor channel width in the X-axis. This equation illustrates the fact that this instrument operates like a typical gyroscope and provides output that is proportional to angular velocity down to DC. Calculations of MET gyroscope performance based on this design show that the bias stability can be directly related to the speed of the liquid in the rotor channel, and indicate that a liquid velocity in the as range of 1-26 cm/sec (depending on the dimensions of the device) will yield a gyro error $\Delta \phi_{gyro}$ low as $1.2 \times 10^{-5}$ rad ($6.8 \times 10^{-4}$ deg).

In preferred embodiments, the flow of the liquid in the rotor channel is constant or nearly constant. To avoid fluctuations in this flow it is useful to have a means for measuring the flow speed and a feedback mechanism to adjust the pumping speed. This can be accomplished by various means, one of which could be the placement of an additional MET transducer in the rotor channel for this purpose.

In preferred embodiments, the gyro according to the invention also has associated control electronics to control the pumping of the rotor channel as described above, supply power to the transducers, correct the signal to account for temperature variations, and other standard signal processing functions to enable a linear signal.

The MET Sensors' Self-Noise in the MET Gyroscope

Analysis of the gyro's performance has identified the following main sources of noise (and thus error):

Thermal Hydrodynamic Self-Noise.

For existing MET cells, the thermal hydrodynamic self-noise is the dominant mechanism at low frequencies and so is also responsible for long period stochastic errors, known for the gyro as bias instability. The thermal hydrodynamic self-noise is the result of the fluctuations of the pressure difference on both sides of the MET transducer.

The most significant conclusion from the analysis of the thermal hydrodynamic noise is that the higher the liquid rotor rotation velocity is, the lower the gyro error will be. Quantitatively speaking, given a liquid rotor rotation velocity of 20 cm/sec, one can estimate a gyro error $\Delta \phi_{gyro} = 0.0023$ deg, suitable for a navigation grade gyroscope.

Convection-Induced Self-Noise.

The convection-induced self-noise is the result of the natural convection of the liquid. Even if the liquid as a whole is stable, small local variations of the liquid density produce vortical flows in the liquid. These flows generate an additional noise in the MET cell output current. Convection-induced noise will become a more significant factor as the concentration of the electrolyte (and thus the density) increases. This means that electrolyte concentration should not be increased unduly (for example, in an attempt to increase the velocity in the MHD cell). However, calculations show that convection-induced noise should not be a significant problem in most of the useful range of electrolyte concentrations.

Turbulent Pulsation-Related Noise.

As discussed above, the sensitivity of the molecular-electronic gyro directly depends on the electrolyte velocity in the rotor channel.

However along with the increasing electrolyte velocity, the flow in the rotor channel can result in turbulent performance. This has the potential to contribute to an additional noise mechanism in the measuring channel, and can be a main contributor to the final self-noise of the instrument if suitable precautions are not taken to ensure non-turbulent flow. Thus the increase in the flow velocity in the rotor channel, has the effect of decreasing the thermal hydrodynamic noise while at the same time potentially increasing the turbulent pulsation noise. It follows that the optimal flow value from the point of view of signal-to-noise ratio is the highest flow that can be achieved before transitioning to the turbulent flow regime. Modeling calculations have indicated that, for certain embodiments, flow in the rotor channel should be laminar at flow velocities of 20 cm/sec and above, so turbulent pulsation noise should not be a problem for the gyro performance.

Shot-noise is a type of electronic noise that occurs when the finite number of particles that carry energy, such as electrons in an electronic circuit or photons in an optical device, is small enough to give rise to detectable statistical fluctuations in a measurement. Shot noise will only be a significant factor for the MET gyro if the transducer conversion coefficient is very low, which could be the case if the transducer area is small and/or the concentration of active species in the electrolyte (triiodide) is low. This should not contribute significantly to the noise of the MET gyro.

Electronic Self-Noise.

The signal conditioning electronics for MET cells include a current to voltage converter and filters. The filters have unity gain in the instrument passband and practically speaking do not contribute to the electronic self-noise.

To decrease the electronic self-noise, the transducer should have high impedance and conversion factor. Also, low-noise operational amplifiers must be used. In all MET cells, the electronic self-noise contributes at relatively high frequencies (usually above 40-50 Hz) if at all, and we expect for the gyro application it will be only a minor source for the self-noise.

Example 1

North-Seeking Measurement Experiment Using MET Angular Rate Sensor

This example presents the results of experiments with an existing MET angular rate sensor operated on a rotating platform, detecting the Earth's rotation through a modulation technique similar to gyrocompassing. The experiments demonstrated the ability to detect true North with a deviation not more than 0.1 degrees (1.8 mils). This shows that MET technology has the sensitivity and noise performance required for azimuth detection at the precision level required for target location applications.

Example 2

Liquid Rotor Experimental Studies to Determine Noise Level

One aspect of the invention is the recognition that one performance feature that characterizes the magnetohydrodynamic pump is the pressure drop formed by the body Lorentz force acting on moving free charge. In general the corresponding pressure drop depends of the MHD geometry, the value of the magnetic field and the electrical current through the cell.

In order to determine if MHD pumping would be capable of generating the liquid rotor speed required to achieve the gyro error calculated above, we performed some preliminary experiments to measure the liquid rate achievable in the rotor channel. For that purpose a prototype of the liquid rotor channel similar to that in the above figure was been fabricated. In these experiments a liquid velocity of 20 cm/sec was been achieved with the same electrolyte used in MET cells. Thus the estimate presented herein of the achievable gyro error appears to be consistent with a model that takes into account mainly thermal hydrodynamic noise.

TABLE 2

Projected critical parameters for the MET gyro at different stages of development

| Parameter | Laboratory prototype (Macro Scale) | Phase II Medium Scale | Phase III Miniature Scale |
| --- | --- | --- | --- |
| Bias Drift Stability | <0.005 deg/hr | <0.005 deg/hr | <0.03 deg/hr |
| Scale Factor stability | <600 ppm | <200 ppm | <70 ppm |
| Angular Random Walk (ARW) | <0.0005 deg/(hr)$^{1/2}$ | <0.0005 deg/(hr)$^{1/2}$ | <0.001 deg/(hr)$^{1/2}$ |
| Full scale range | >50°/s | >100°/s | >300°/s |
| Bandwidth | DC-10 Hz | DC-150 Hz | DC-300 Hz |
| Power Consumption | 60 mW | 7 mW | <10 mW |
| Operating temperature range | −55° C. to +75° C. | −55° C. to +85° C. | −55° C. to +85° C. |
| Size (w/ control electronics) | 40 × 40 × 30 mm | 20 × 20 × 15 mm | 15 × 15 × 15 mm |

Based on this new gyro, MET Tech has developed a design for an azimuth detection system with accuracy better than 1 mil. The component parts of the new gyro have been demonstrated, including the construction of a fluid rotor with pumping speed sufficient to achieve the above level of error. Modeling calculations have projected the performance characteristics shown in Table 2 for the MET gyro at different stages of development.

MET Tech has developed a family of inertial sensors based on an electrochemical sensing mechanism, with an attractive combination of high performance, ruggedness, low power consumption, compact size, and potentially low cost. Existing devices have demonstrated performance comparable to much larger and more expensive commercial sensors. An experiment was described where MET angular rate sensors were used to measure the direction of true North to an accuracy better than 2 mils, using a modulation technique. A new MET true gyroscope was described with the potential for azimuth detection of even greater accuracy.

What is claimed is:

1. A gyroscope comprising:
   two intersecting fluid channels, the two fluid channels comprising a first channel and a second channel,
   wherein the first fluid channel forms a first closed loop and the second channel forms a second closed loop;
   wherein the first channel contains a liquid electrolyte and is configured to permit circulation of the liquid electrolyte through the first closed loop; and
   wherein the second channel comprises a molecular electronic transducer that is configured to measure a current flow in the second closed loop.

2. The gyroscope according to claim 1, wherein the circulation of liquid electrolyte in the first fluid channel is sustained by magnetohydrodynamic forces.

3. The gyroscope according to claim 2, wherein the magneto hydrodynamic forces are created by a magnetohydrodynamic cell comprising permanent magnets.

4. The gyroscope according to claim 3, wherein the magnetohydrodynamic cell further comprises a plurality of electrodes within a magnetic field generated by the permanent magnets.

* * * * *